United States Patent
Brabec et al.

(10) Patent No.: US 8,018,454 B2
(45) Date of Patent: Sep. 13, 2011

(54) VOLUME RENDERING PROCESSING DISTRIBUTION IN A GRAPHICS PROCESSING UNIT

(75) Inventors: Stefan Brabec, Stamberg (DE); Thilaka S. Sumanaweera, Los Altos, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/903,356

(22) Filed: Sep. 20, 2007

(65) Prior Publication Data

US 2008/0018642 A1    Jan. 24, 2008

Related U.S. Application Data

(62) Division of application No. 11/126,043, filed on May 9, 2005, now Pat. No. 7,714,855.

(60) Provisional application No. 60/572,077, filed on May 17, 2004.

(51) Int. Cl.
G06T 15/00 (2011.01)

(52) U.S. Cl. ........ 345/419; 345/420; 345/424; 345/426; 345/502; 600/407

(58) Field of Classification Search .................. 345/419, 345/420, 424, 426, 502; 600/407
See application file for complete search history.

(56) References Cited

U.S. PATENT DOCUMENTS

| | | | |
|---|---|---|---|
| 4,984,157 A * | 1/1991 | Cline et al. ..................... 345/424 |
| 5,113,357 A | 5/1992 | Johnson et al. | |
| 5,201,035 A * | 4/1993 | Stytz et al. ..................... 345/502 |
| 5,289,383 A * | 2/1994 | Sawamura et al. ........... 700/187 |
| 5,435,310 A | 7/1995 | Sheehan et al. | |
| 5,601,084 A | 2/1997 | Sheehan et al. | |
| 5,678,554 A | 10/1997 | Hossack et al. | |
| 5,734,384 A | 3/1998 | Yanof et al. | |
| 5,782,762 A | 7/1998 | Vining | |
| 5,920,319 A * | 7/1999 | Vining et al. ................. 345/420 |
| 5,934,288 A | 8/1999 | Avila et al. | |
| 5,986,662 A * | 11/1999 | Argiro et al. .................. 345/424 |
| 6,023,279 A | 2/2000 | Sowizral et al. | |
| 6,043,589 A | 3/2000 | Hanafy | |
| 6,057,632 A | 5/2000 | Ustuner | |
| 6,179,780 B1 | 1/2001 | Hossack et al. | |
| 6,366,800 B1 | 4/2002 | Vining et al. | |
| 6,757,423 B1 | 6/2004 | Amini | |
| 6,831,642 B2 | 12/2004 | Mech | |
| 6,852,081 B2 | 2/2005 | Sumanaweera et al. | |
| 6,909,913 B2 * | 6/2005 | Vining ......................... 600/407 |
| 6,995,763 B2 * | 2/2006 | Gatti et al. .................... 345/424 |
| 7,102,634 B2 | 9/2006 | Kim et al. | |

(Continued)

OTHER PUBLICATIONS

Hugues Hoppe, "Progressive Meshes", Proceedings of the 23$^{rd}$ Annual Conference on Computer Graphics and Interactive Techniques 1996, pp. 99-108.

*Primary Examiner* — Phu Nguyen (57) ABSTRACT

An intersection of a cut plane with a proxy geometry representing a scan volume is determined with a processor. The intersection is simplified, such as identifying a quadrilateral or triangle most closely enclosing the intersection. The vertex processor of a GPU deforms a reference grid and determines Cartesian coordinates and the texture coordinates for grid points of the reference grid as a function of the input intersection. The vertex processor provides coordinates for data for subsets of cut planes. The fragment processor inputs the texture coordinates and retrieves the data from the texture memory. The data is blended. The blended subsets are then blended together in the frame buffer of the GPU.

13 Claims, 3 Drawing Sheets

U.S. PATENT DOCUMENTS

| | | |
|---|---|---|
| 7,119,810 B2 | 10/2006 | Sumanaweera et al. |
| 7,149,564 B2 * | 12/2006 | Vining et al. ............... 600/425 |
| 7,154,500 B2 | 12/2006 | Heng et al. |
| 7,343,031 B2 | 3/2008 | Pedrizzetti et al. |
| 7,408,546 B2 * | 8/2008 | Serra ............................ 345/419 |
| 7,483,034 B2 * | 1/2009 | Chefd'hotel et al. ......... 345/582 |
| 2002/0145607 A1 | 10/2002 | Dimsdale |
| 2004/0138560 A1 | 7/2004 | Paladini |
| 2004/0181151 A1 | 9/2004 | Sumanaweera et al. |
| 2005/0043619 A1 | 2/2005 | Sumanaweera et al. |
| 2005/0122333 A1 | 6/2005 | Sumanaweera et al. |
| 2005/0140682 A1 | 6/2005 | Sumanaweera |
| 2005/0253841 A1 | 11/2005 | Brabec et al. |
| 2006/0056690 A1 | 3/2006 | Schoisswohl et al. |
| 2008/0012852 A1 | 1/2008 | Brabec et al. |

* cited by examiner

VOLUME RENDERING PROCESSING DISTRIBUTION IN A GRAPHICS PROCESSING UNIT

CROSS-REFERENCE TO RELATED APPLICATION

This application is a divisional of U.S. patent application Ser. No. 11/126,043, filed May 9, 2005, now U.S. Pat. No. 7,714,855.

RELATED APPLICATIONS

The present patent document claims the benefit of the filing date under 35 U.S.C. §119(e) of Provisional U.S. Patent Application Ser. No. 60/572,077, filed May 17, 2004, which is hereby incorporated by reference.

BACKGROUND

The present invention relates to three-dimensional imaging. In particular, three-dimensional (3D) imaging uses data acquired in a different format than the display format, such as 3D imaging from data for a medical scan.

Volume rendering generates two-dimensional images from three-dimensional data volumes. Magnetic resonance imaging (MRI), computed tomography (CT) and ultrasound scanning use volume rendering for three-dimensional imaging. Data representing a volume, such as data representing a plurality of two-dimensional planes spaced within the volume or as data representing a plurality of different lines spaced within a volume, is obtained. The 3D representation is rendered from this data. Typically, software that is computationally expensive and time consuming implements volume rendering.

Ultrasound data formatted in a display Cartesian coordinate grid are volume rendered using graphic accelerators, such as graphic accelerators for general purpose personal computers. The data is interpolated or scan converted along a Cartesian coordinate 3D grid before volume rendering. Three-dimensional texturing using application programming interfaces, such as OpenGL or DirectX, is used to render the three-dimensional data set.

U.S. Pat. No. 6,852,081 discloses volume rendering three-dimensional data sets in an acoustic or other non-Cartesian grid in real time using graphics accelerators. For example, commercially available graphic accelerators cards using 3D texturing may provide 256×256×128 8 bit volumes at 25 volumes per second or better for generating a display of 512×512 pixels using ultrasound data. By rendering from data at least in part in an acoustic grid, the amount of scan conversion processing is reduced or eliminated prior to the rendering. A processor provides texture coordinates and corresponding vertices for quadrilaterals or triangles defined in a Cartesian space to a graphics processing unit (GPU). The GPU identifies the appropriate texture data and renders the 3D representation.

BRIEF SUMMARY

By way of introduction, the preferred embodiments described below include methods, systems and computer readable media for determining coordinate data used by a graphics processing unit, for vertex processing in the graphics processing unit, for blending during volume rendering with the graphics processing unit, and for volume rendering medical scan data with the graphics processing unit. An intersection of a cut plane with a proxy geometry representing the scan volume is determined with a processor. The intersection is simplified, such as identifying a quadrilateral or triangle most closely enclosing the intersection. Providing the simplified intersection allows the processor to dedicate function calls to other actions than rendering. The vertex processor deforms a reference grid and determines texture coordinates for grid points of the reference grid as a function of the input intersection. Deformation by the vertex processor limits the resources required by the processor. The vertex processor provides data for subsets of cut planes. Parallel processing of cut planes increases performance. The data is blended. The blended subsets are then blended together in the frame buffer of the GPU. Blending the subsets may reduce the number of read backs from the frame buffer for blending. The work load for rendering may be more evenly distributed between the processor and components of the GPU.

In a first aspect, a method is provided for vertex processing in a graphics processing unit. A reference grid is received. The reference grid is deformed as a function of a first cut plane. The deforming is performed by a vertex processor of the graphics processing unit.

In a second aspect, a computer readable storage medium has stored therein data representing instructions executable by a vertex processor of a graphics processing unit for vertex processing as part of volume rendering. The instructions are for: receiving a reference grid and coordinates for three or more vertices defining an intersection of a first cut plane with a proxy geometry; and calculating with the vertex processor texture coordinates in an acoustic domain as range, azimuth and elevation values for grid points within the reference grid.

In a third aspect, a method is provided for blending during volume rendering with a graphics processing unit. With a fragment processor of the graphics processing unit, first and second data for first and second subsets, respectively, of cut planes are blended. The blended first and second data is then blended.

In a fourth aspect, a method is provided for determining coordinate data used by a graphics processing unit. Vertices of an intersection of a cut plane with a geometry representing a scanned volume are identified. If a number of the vertices is greater than four, a fewer number of vertices defining a polygon most closely enclosing the intersection is identified, the vertices having coordinates. The coordinates are input to the graphics processing unit.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Volume rendering performance (frame rate) may be increased by distributing computation load evenly between the vertex- and fragment-processor stages of graphics processing units and by reducing the data read-back from the frame buffer. A reference grid is deformed in a vertex processor using the vertices of an intersection. The blending of at least two cut-planes inside the fragment processor to output effective opacity and opacity-weighted colors for the cut-planes for further blending reduces the data read-back from the frame buffer. Non-affine coordinate transformations access the sampled volume data without the need of pre-computed, sampled coordinate lookup tables. The quality of the resulting image may be increased in some implementations due to the higher numerical precision used for the blending and for vertex processing operations. Because multiple cut-planes are blended inside the fragment processor, these operations are performed at floating or fixed point precision, whereas normal frame buffer blending usually works on 8 bits only, resulting in visible quantization artifacts.

I. Ultrasound System for Volume Rendering

Figure 1:
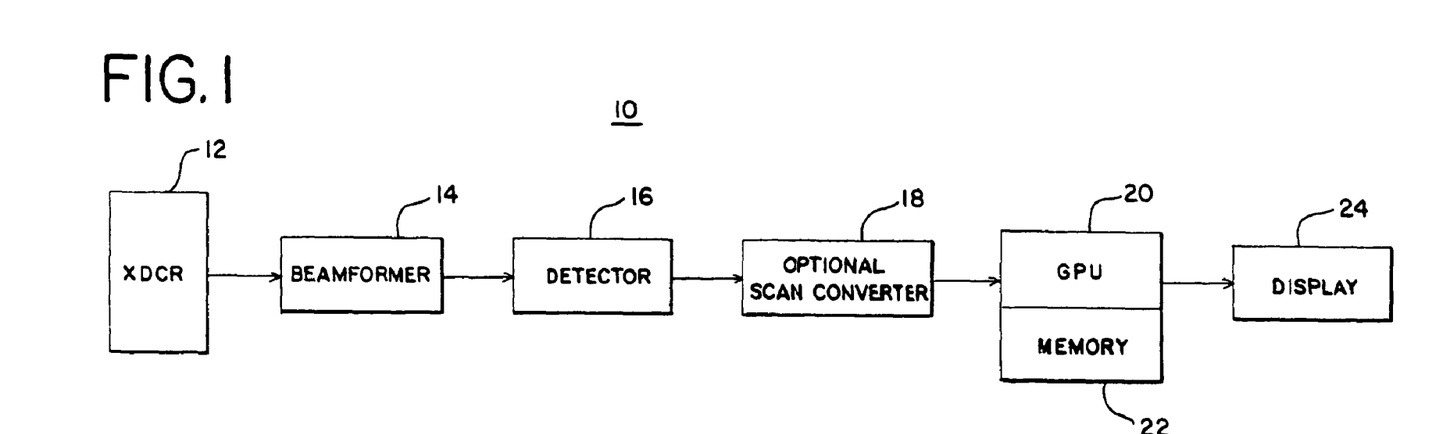
FIG. 1 is a block diagram of one embodiment of an ultrasound system for volume rendering ultrasound data.

FIG. 1 shows an ultrasound system 10 for volume rendering ultrasound data for 3D imaging. The ultrasound system 10 includes a transducer 12, a beamformer 14, a detector 16, an optional scan converter 18, a GPU 20 with a memory 22, and a display 24. Additional, different or fewer components may be provided, such as providing a control processor for configuring the system 10 and providing scan position information to or from the beamformer 14 to the GPU 20 or memory 22 and/or providing another processor for identifying vertices for an cut plane used in texture mapping by the GPU 20. In alternative embodiments, the system 10 is a MRI, CT, positron emission tomography (PET) or other medical system for scanning a volume of a patient in any format.

The transducer 12 comprises a 1, 1.25, 1.5, 1.75, or two-dimensional array of elements. The array of elements is configured as linear, curvilinear, sector, Vector®, or other imaging configurations. In one embodiment, the transducer 12 is configured to allow electrical steering on the transmit- and receive-beams in two dimensions, such as steering along an azimuthal axis and an elevation axis. For example, one or two rows of elements are configured for steering in the azimuthal direction electronically in response to delays and apodization and in the elevation direction in response to frequency, such as disclosed in U.S. Pat. No. 6,043,589; 5,678,554; and 6,057,632, the disclosures of which are incorporated herein by reference. Variations in the thickness of the transducer along the range dimension as a function of elevation allow for frequency based steering in elevation. As another example, a one-dimensional or multi-dimensional array is mechanically wobbled or steered in the elevation dimension, such as disclosed in U.S. Pat. Nos. 4,151,834 and 4,399,822, the disclosures of which are incorporated herein by reference. In other embodiments, the transducer 12 comprises a multi-dimensional array for steering in the elevation and azimuthal dimensions in response to relative delays and apodization. Alternatively, the transducer 12 comprises a linear array or multi-dimensional array for electronically steering in the azimuthal dimension and for orienting in the elevation dimension in response to user movement of the transducer 12. As yet another alternative, a transducer that is rotatable around a range axis allows scanning a volume. Other transducers now known or later developed for electrical and/or mechanical steering in an elevation and azimuthal dimensions may be used.

The beamformer 14 controls delays, apodization, frequency or other electrical characteristic and/or controls a mechanical positioning or sensing of the position of the transducer 12 for electrically and/or mechanically focusing the array of elements of the transducer 12 along one or more scan lines. The beamformer 14 connects with the transducer 12 for generating acoustic beams along an acoustic grid corresponding to the scan lines. For example, a polar coordinate format is used in a two-dimensional plane or a three-dimensional volume to acquire signals representing range samples along scan lines within the plane or volume. The acoustic data is collected by rocking, rotating, or sliding the transducers with mechanical movement or using electronic beam steering. In a polar coordinate format acoustic grid, the scan lines are at a same or different angle in one or both of the azimuth and elevation dimensions, emanate from a same or different point along the face of the transducer and are sampled along a range dimension. In alternative embodiments, a cylindrical grid or other coordinate system is used. The scan lines are parallel, such as associated with linear imaging, or diverging, such as associated with sector or Vector® scanning. The acoustic grid comprises a sample pattern defined by the various scan lines and sampling along the scan lines. The sampling of acoustic information is in a Cartesian grid, polar grid, hexagon grid, cylindrical grid or other grid system. Where the sampling is along a Cartesian grid, such as using a linear array, the sampling is likely on a larger scale or with a different resolution than the display Cartesian grid. As a result, scan conversion is typically performed on such data, but may be minimized or eliminated using the processes described herein.

The detector 16 comprises a B-mode, Doppler, flow or other detector for identifying intensity, energy, velocity or other information from the beamformer signals.

The optional scan converter 18 converts from the acoustic grid to a Cartesian coordinate grid, such as associated with a display. Where a three-dimensional representation is rendered from data free of formatting along a Cartesian coordinate, the scan converter 18 is skipped, not provided, or turned off. In embodiments where some data is formatted in a Cartesian coordinate system, the scan converter 18 converts some data from the acoustic grid to the Cartesian coordinate grid. For example, the scan-converter 18 scan-converts a plurality of two-dimensional images or planes from an acoustic grid to a Cartesian coordinate grid. Where each of the planes represents a different plane within the scanned volume, the planes are positioned relative to each other as part of the acoustic grid without scan-conversion into an entirely 3D Cartesian grid. Each plane comprises ultrasound in a display Cartesian coordinate grid.

The memory 22 comprises a video random access memory, a random access memory, a removable media (e.g. diskette or compact disc) or other memory device for storing data or video information. In one embodiment, the memory 22 comprises a video random access memory of the graphics processing unit 20. In alternative embodiments, the memory 22 is separate from the graphics processing unit 20, such as a cache memory of a processor, the system memory or other memory. The memory 22 is operable to store ultrasound data formatted in an acoustic grid, at least in part an acoustic grid, such as data in both a Cartesian coordinate grid and acoustic grid or data representing a volume in a 3D grid.

The GPU 20 comprises a graphics accelerator chip, processor, applications specific integrated circuit, circuit, or accelerator card. In one embodiment, the GPU 20 comprises a personal computer graphics accelerator card or components, such as manufactured by nVidia (e.g. Quadro4 900XGL or others), ATI (e.g. Radeon 9700 or others), or Matrox (e.g. Parhelia or others). The GPU 20 provides hardware devices for accelerating the volume rendering processes, such as using application programming interfaces for three-dimensional texture mapping. Example APIs include OpenGL and DirectX, but other APIs may be used independent of or with the GPU 20. The GPU 20 is operable to volume render the ultrasound data, such as volume rendering from ultrasound data free of conversion to a Cartesian coordinate format or ultrasound data including data both in a Cartesian coordinate format and acoustic format. The GPU 20 is operable to texture map with alpha blending or other volume rendering of the ultrasound data based on a spatial relationship of an intersection of a plane (cut plane) or a curved surface perpendicular to the viewing direction with an acoustic grid or data space.

The GPU 20 and/or the memory 22 are included within the system as part of a single ultrasound system component, such as an ultrasound system on a cart in a same housing. In alternative embodiments, the GPU 20 and memory 22 are provided separate from an ultrasound data acquisition system, such as provided in a workstation or personal computer. The ultrasound data at least in part in the acoustic grid is transferred wirelessly, over a computer network or through a transferable storage medium to the GPU 20.

The display 24 comprises a CRT, LCD, flat panel, plasma screen, video projector or other device for displaying a two-dimensional representation of a three-dimensional volume. For example, the display 24 comprises a color display, but monochrome displays may be used.

Using a user interface of the system 10 in conjunction with the GPU 20 and the display 24, the user views renderings of the ultrasound data from various viewing angles to perceive a three-dimensional view from the two-dimensional display. Each representation is associated with a different viewing angle. Using a same set of acoustic data or a continuing stream of acoustic data, multiple two-dimensional representations of the three-dimensional volume are provided. In one embodiment, the GPU 20 is operable to generate images of at least 512×512 pixels at 25 times or more a second for real time imaging. By continuous scanning by the beamformer 14 or continuous input of data, the GPU 20 generates two-dimensional representations from any of various angles of a scanned volume showing changes within the scanned volume seemingly as they occur. Frame rates of 25 frames or more a second are generally associated with real-time scanning. By using the hardware acceleration of the GPU 20 and minimizing or eliminating the scan-conversion step, more rapid volume rendering is provided for real time imaging. In one embodiment, a volume associated with 256×256×128 samples of 8 bit data are provided at 25 volumes per second rendering 512×512 pixels images also at about 25 images a second. Preferably, the two-dimensional representations have minimal artifacts, such as little or barely noticeable Moiré patterns or stair stepping patterns from under-sampling.

Figure 2:
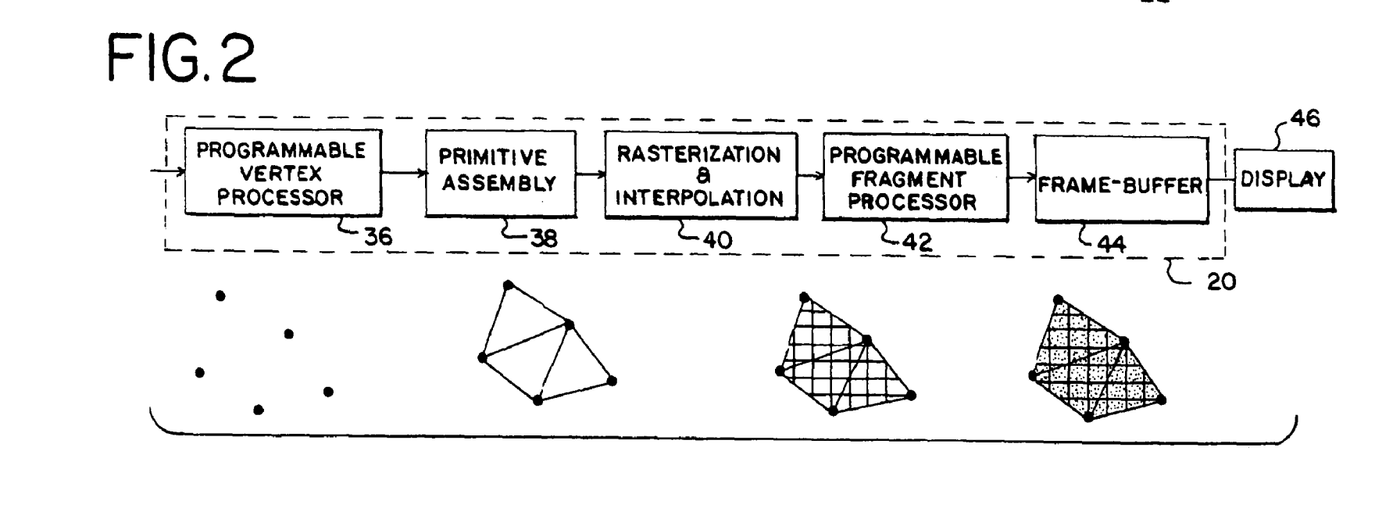
FIG. 2 is a block diagram of one embodiment of a graphics processing unit.

FIG. 2 shows the graphics processing pipeline standardized by APIs such as OpenGL and DirectX. The GPU 20 includes one or more programmable vertex processors 36 (e.g., 1-4 vertex processors), a primitive assembly 38, a rasterization and interpolation block 40, one or more programmable fragment processors 42 (e.g., 1-4 fragment processors) and a frame-buffer 44. The input to the vertex processor 36 is a set of vertices in two- or three-dimensional space defining an intersection. Each vertex has a set of attributes such as coordinates, color, texture coordinates, etc. The vertex processor 36 maps attributes of the incoming vertex into a new set of values. This mapping is for all of the attributes or some of the attributes. The mapping is a linear transformation or a more complex type of mapping. The output of the vertex processor 36 is a set of attributes for each vertex.

These vertices are fed into the next stage, the primitive assembly 38. Here, the vertices are grouped together to form points, lines and triangles. These primitives are then fed into the rasterization and interpolation stage 40. This stage rasterizes each primitive, such as points, lines and triangles, into a set of fragments. A fragment is a pixel with a depth associated with it and is located on a primitive. The fragments have attributes such as color, coordinates and texture coordinates, etc.

The programmable fragment processor 42 takes in these fragments, applies various processes on them, creates pixels and blends subsets of the fragments. The blended pixels have attributes, such as color, and are written into the final stage, the frame-buffer 44. The frame buffer 44 is a memory, buffer or other device for receiving the pixels from the fragment processor 42 for display on the display 46. Alpha or other blending is performed from the frame buffer 44 by reading back the currently blended data for blending with other blended subset data.

Other now known or later developed structures and processes may be used in the graphics pipeline for graphics rendering. The blocks shown in FIG. 2 are high level blocks. Each block contains many other finer processing stages. For example, the rasterization and interpolation stage 40 can contain such operations such as Scissor Test, Alpha Test, Stencil Test, Depth Test, etc.

The GPU 20 is operable to receive graphics data and generate a display on the display 46 from the graphics data. The process is performed pursuant to an application programming interface, such as GDI, GDI+, DirectX, OpenGL, or other APIs now know or later developed. Additionally or alternatively, the GPU 20 is used to process ultrasound data for other purposes than this immediate display. For example, in-phase and quadrature data, post detection data, log compressed data, scan converted or any other ultrasonic data is input to the GPU 20. Using the programmable vertex processor 36 and/or the fragment processor 42, the ultrasound data is processed. OpenGL, DirectX extensions or other programming languages, such as Cg shader language, program the GPU 20 to process ultrasound data. HLSL, Stanford's high-level shader language or other now known or later developed shader languages may also be used. Some resource intensive computations are performed by the GPU 20 rather than another processor, such as a CPU, DSP, ASIC or FPGA. Since the GPU 20 functions as a computational engine, one or more additional outputs are provided. For example, an output is provided downstream of the programmable vertex processor 36 but upstream of the fragment processor 42. As an alternative or additional output, an output is provided after the fragment processor 42. Alternatively, the output from the frame buffer is used.

FIGS. 3-7 represent stages of method for volume rendering from an acquired set of data representing a volume using, at least in part, the GPU 20. The method is implemented with the same or different systems shown in FIGS. 1 and/or 2. The method is conceptually divided into three stages, but other divisions are possible. First, a method is provided for determining coordinate data to be used by a graphics processing unit. Second, a method is provided for vertex processing in the graphics processing unit. Third, a method is provided for fragment processing and blending during volume rendering with the graphics processing unit. Any one, two or all three of the stages may be used. The method is used for 3D cardiology or radiology, but other medical or non-medical data may be used.

Figure 3:
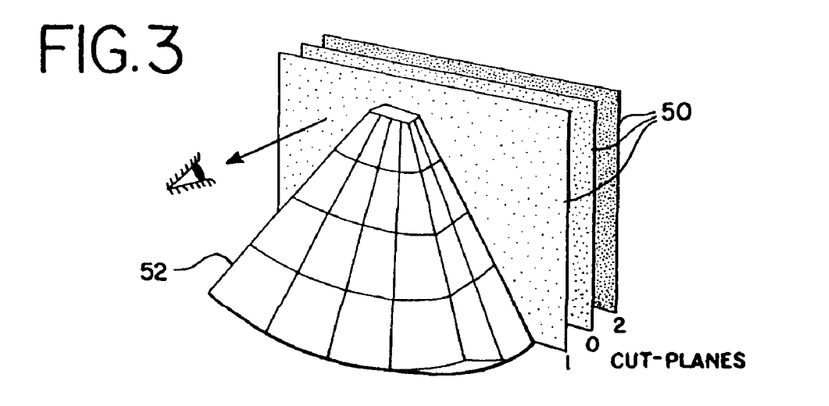
FIG. 3 is a graphical representation of one embodiment of a volume relative to cut planes.

The coordinate data to be input to the GPU is determined. FIG. 3 illustrates one embodiment of a method for volume rendering. A series of cut planes 50 are rendered from back to front or front to back. The cut planes 50 are generally parallel slices through the volume 52 and are generally orthogonal to a viewing direction. For rendering, the cut planes 50 position relative to the volume 52 represented by data is identified.

Figure 4:
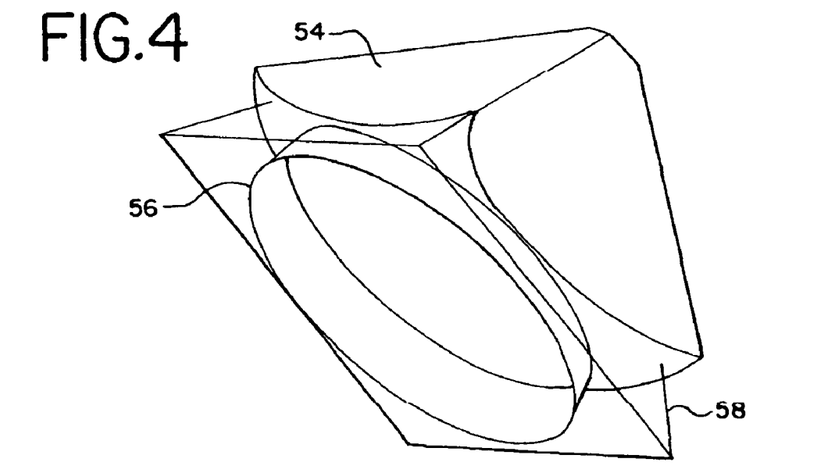
FIG. 4 is a graphical representation of acquired volume data relative to a proxy geometry in one embodiment.

Vertices or other parameters of an intersection of a cut plane 50 with the volume 52 are identified. The volume 52 is a 3D geometry of an actual volume space represented by data or a proxy geometry approximating the scanned volume. FIG. 4 shows an actual volume space 54 for which a transducer of an ultrasound system may acquire data in a 3D space. The actual volume space 54 includes all the ultrasound lines possible using a 2D array for a given field of view. The conical band 56, shown in part, highlights a region where data is actually acquired. The pyramid is a proxy geometry 58 (e.g., proxy pyramid) to contain the conical band 56 and the acquired ultrasound lines is the smallest size of a given shape enclosing the cone 56. Other shapes than a pyramid or cone may be used. The proxy geometry may be a cone, such as being the same as the region of acquired data, may be the actual volume space 54 or other shapes. The cone 56 or region where data is actually acquired may have different shapes, such as sharing the pyramid shape or the actual volume space 54. Other relative sizes with more or less "0" value space (i.e., spatial locations without data having been acquired) may be used.

Figure 5A:
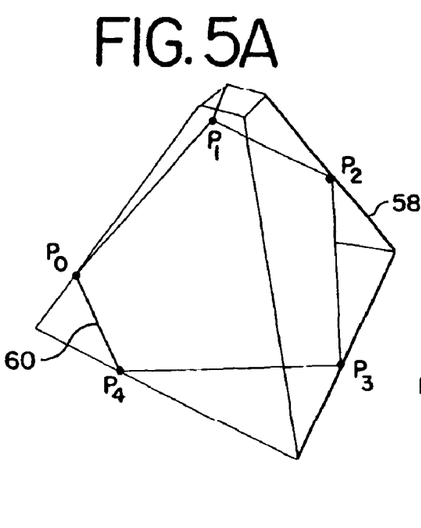
FIGS. 5A and 5B are graphical representations of simplifying an intersection with a proxy geometry in one embodiment.

Once the viewing or rendering direction is determined, one or more cut planes are known. Using the proxy geometry 58, a shape or location of intersection 60 of the cut plane 50 with the proxy geometry 58 is determined as represented in FIG. 5A. The points $P_{0-4}$ defining the shape of the intersection 60 are identified. When intersecting a cut plane with a pyramid, the result can be a point, a line, a triangle, a quadrilateral, a pentagon or a hexagon. In the example shown in FIG. 5A, the vertices $P_{0-4}$ of the intersection define a pentagon. Intersecting with other proxy geometries may provide for similar or different range of possible shapes.

The intersection may be simplified. If a number of the vertices is greater than a desired number, a fewer number of vertices having coordinates defining a polygon most closely enclosing the intersection is identified. For example, the desired number of vertices defining the intersection is four, such as identifying four vertices having coordinates defining a quadrilateral. In the example shown in FIG. 5A, the pentagon is to be simplified to a quadrilateral shown as the intersection 62 in FIG. 5B. The simplified intersection 62 encloses the actual intersection 60. This simplified intersection 62 in the example of FIGS. 5A and B is defined by the quadrilateral P0-3 of intersection. A processor, such as a central processing unit (CPU) or the vertex processor 36, identifies the quadrilateral P0-3.

To identify the simplified intersection 62, such as reducing a pentagon to a quadrilateral, one or more vertices are removed and the other vertices are adjusted. In the example, $P_0$ in FIG. 5A is removed and the adjacent vertices are adjusted. For each point $P_i$, the lines $[P_{i-1}, P_{i-2}]$ and $[P_{i+1},$ $P_{i+2}]$ are intersected with the line $[P_i, P_i+(P_{i-1}-P_{i+1})]$, which is the line parallel to $[P_{i-1}, P_{i+1}]$ going through $P_i$. This way $P_i$ can be removed by adjusting the adjacent points $P_{i-1}$, and $P_{i+1}$ with the found intersections. To find the optimal $P_i$, all points are checked and $P_i$ for which the added area is minimal is selected.

Figure 5B:
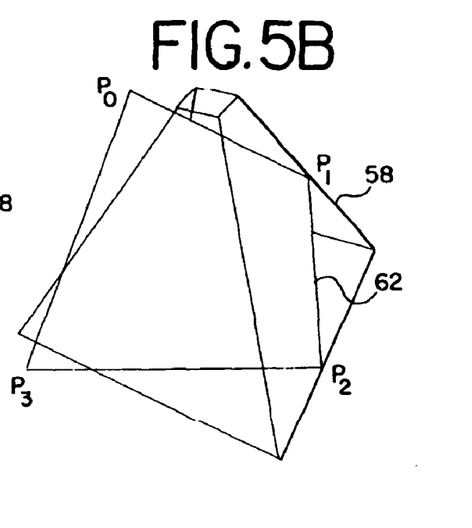

If the intersecting polygon 60 is a hexagon, the process is performed twice (6→5→4). The hexagon is first converted into a pentagon and then into a quadrilateral in two steps. Similarly, if the intersecting polygon is a triangle, a degenerated quadrilateral, e.g. $(P_0, P_0, P_1, P_2)$, is employed instead. Intersections resulting in a line or point are discarded, since such intersection have no area. Other methods to reduce a number of sides of a polygon may be used.

The coordinates of the vertices of the quadrilateral are input to the graphics processing unit. In alternative embodiments, other representations of the cut-plane may also be used. For example, if the proxy geometry is a cone, a portion of shape of intersection of the cone and a cut-plane is a conic. Hence, the complete shape can be described using a few parameters. These parameters are then sent to the vertex processor for deforming a reference grid. The reference grid, in this case, may be a grid in a polar coordinate system. The computation of the quadrilateral defining the plane of intersection is performed by the CPU and uploaded into the GPU or stored in the GPU. In alternate embodiments, the computation of the quadrilateral defining the plane of intersection is performed by the GPU.

Figure 6:
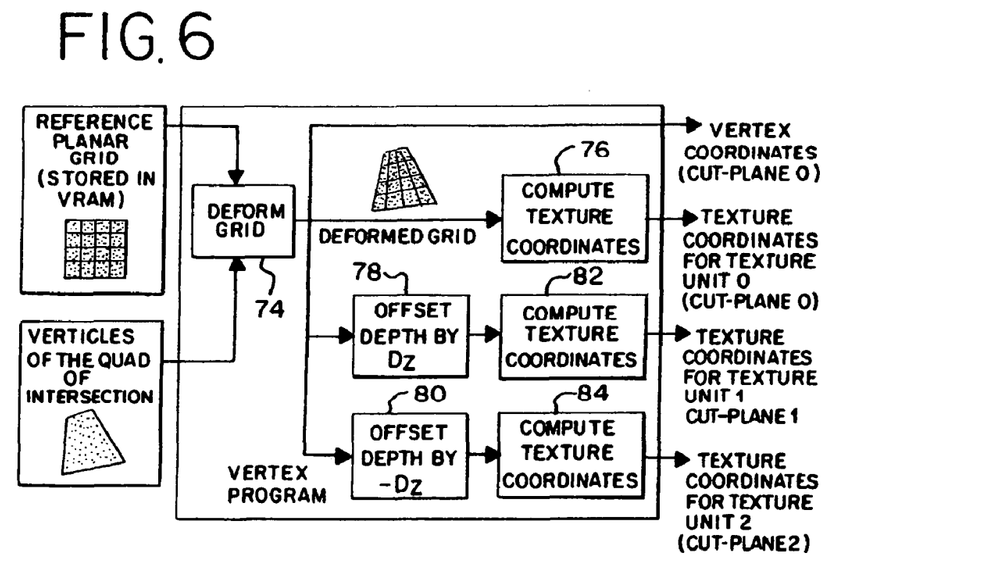
FIG. 6 is as flow chart diagram of one embodiment of a method for vertex processing.

FIG. 6 shows a method for vertex processing in the graphics processing unit. A vertex program operates pursuant to the method. The vertex processor(s) of the graphics processing unit receive the coordinates of the vertices defining the intersection of one or more of the cut planes with the proxy geometry 58, such as the volume space 54, acquisition space 56 or another volume. For example, the coordinates of the vertices of the quadrilateral P0-3 of intersection for the cut plane 50 numbered 0 in FIG. 3 are communicated to the vertex processor in act 70. Three or other number of vertices may be communicated. For simplicity, the example of a quadrilateral is used below. The coordinates are dependent upon the cut-plane 50 and the viewing direction. For a given viewing direction, the coordinates may be pre-computed by the CPU and loaded into the video RAM for fast access by the vertex program or may be input in real time from the CPU.

As represented in act 72, a reference grid is also input to the vertex processor(s), either from a memory or processor within or external to the vertex processor of the graphics processing unit. For example, the reference grid is loaded into the video RAM (VRAM) of the GPU for each cut plane 50, for each rendering, for a series of renderings, each time the GPU is booted or to be used or permanently. For example, the reference grid is invariant across all cut-planes, so is loaded into the VRAM of the GPU once during the initialization phase.

The reference grid is in a Cartesian coordinate space. The reference grid is an N×M grid where N and M are greater than 3, 10 or other value. N and M are equal or different. For example, the loaded reference grid is a planar grid of straight lines where N and M are 20. The grid includes straight, curved, angled, other lines or combinations thereof in other embodiments. The intersection of lines in the grid indicates grid points. The reference grid is a collection of vertices, with the $(i, j)^{th}$ vertex containing the weights $(a_i, b_j)$, where $a=i/(N-1)$, $i=0, \ldots, N-1$ and $b=j/(M-1)$, $j=0, \ldots, M-1$. For example, horizontal (i) and vertical (j) components of each grid point has a value from 0 to 1, with 0 being at the one end of the grid while 1 being at the opposite end of the grid. A grid point in the middle of the reference grid has 0.5, 0.5 for i and j components.

To determine Cartesian x, y, z values for each grid point, the reference grid is deformed as a function of the cut plane in act 74. The corners of the reference grid are mapped to the vertices of the quadrilateral of intersection. Since the coordinates of the vertices of the quadrilateral are known to the vertex processor, the coordinates of each of the grid points are computed using bi-linear interpolation with the weight, $(a_i, b_j)$, of the grid point. Assuming weight (0, 0) corresponds to $P_0$, (1, 0) corresponds to $P_1$, (1, 1) corresponds to $P_2$ and (0, 1) corresponds to $P_3$ ($P_{0-3}$ are the coordinates of the vertices of the quadrilateral), the coordinate of the $(i, j)^{th}$ vertex of the deformed grid is give by: $b_j[(1-a_i)P_0+a_iP_1]+(1-b_j)[(1-a_i)P_3+a_iP_2]$. The vertex processor of the graphics processing unit performs the deformation.

In act 76, texture coordinates of the grid points in the deformed reference grid are calculated by the vertex processor. Where the data is in an acoustic or polar coordinate format, the texture coordinates are calculated in an acoustic domain, such as range, azimuth and elevation values and output as "Texture coordinates for texture unit 0".

Because vertex programs allow more complex and longer programs than the fragment stage, the computation of texture coordinates can be a nearly arbitrary mapping function (e.g. the non-affine transformation from a Cartesian to an acoustic coordinate system). In using a finely tessellated reference grid (e.g., N and M of 10 or more), per-vertex correct texture coordinates can be achieved. As long as the tessellation is fine enough and the coordinate transformation is more or less smooth, the resulting error due to the linear interpolation may be negligible. As the quadrilateral of intersection is a tight convex bounding hull of the original cut shape, embodiments of the method can be implemented to ensure that most of the vertices of the reference grid lie inside the volume data set and are used for texture coordinate interpolation.

In acts 78, the Cartesian coordinates of the grid points are also perturbed by the slice-separation, +Dz, along the "into-the-screen" direction to compute the deformed grid corresponding to cut-plane 1 of FIG. 3. In act 82, the texture coordinates or the coordinates of the data in the acoustic grid for perturbed grid points are also computed and output as the "Texture coordinates for the texture unit 1". Similarly, the original grid points are perturbed by −Dz in act 80 to compute the deformed grid for cut-plane 2, which are in turn used to compute the "Texture Coordinates for the texture unit 2" in act 84. A greater or fewer number, such as none or only one additional cut plane based on the intersection of an adjacent cut plane is identified by the vertex processor. For acts 78 and 80, a quadrilateral of intersection for a cut-plane perturbed by +Dz has a different shape than the quadrilateral of intersection for an unperturbed cut-plane. The same is true for the quadrilateral of intersection for a cut-plane perturbed by −Dz. Because of this, a grid point on the boundary of the unperturbed quadrilateral, once perturbed, may end up inside the proxy-geometry or even inside the boundary of the data region. This leads to slight unwanted loss of data at the border. To compensate for this, a new quadrilateral, which is a superset or the convex-hull of the quadrilaterals of intersections from all the perturbed and unperturbed cut-planes is first computed, and the coordinates of the vertices of this new quadrilateral are sent to the vertex processor as P0-3.

The vertex coordinates of cut-plane 0, and texture coordinates for texture units 0, 1 and 2 are then output by the vertex program and passed onto the rasterization stage of the graphics pipeline. The vertex processor or processing method provides acoustic coordinates for each grid point. For each grid point, an acoustic coordinate and an x, y, z (Cartesian coordinate) is known.

The texture coordinates are linearly interpolated across each triangle processed by the rasterizer and sent to the fragment processor for further processing. For example, the rasterizer determined texture values for any desired points within a given tile or surface bounded by four adjacent grid points. The acoustic coordinates of the grid points are rasterized or interpolated to identify texture values within the tile. Other numbers of grid points, such as a nearest three grid points, may be interpolated to determine a give texture coordinate.

Figure 7:
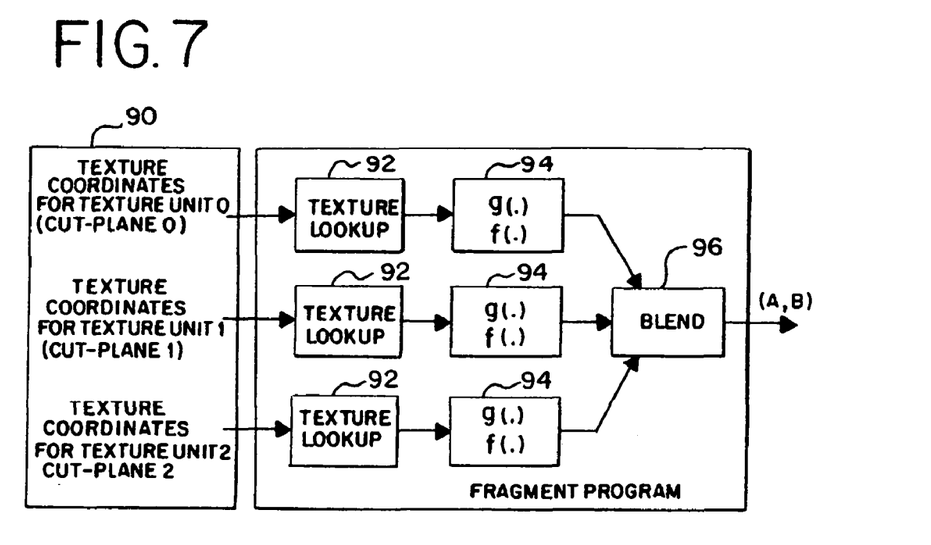
FIG. 7 is a flow chart diagram of one embodiment of a method for blending.

FIG. 7 shows a method for blending during volume rendering with a graphics processing unit. Blending is incorporated as part of fragment processing. Subsets of data corresponding to subsets of cut planes are blended together. The subsets are then blended using the frame buffer. By blending subsets, the number of read backs from the frame buffer may be reduced. A fragment program implements the method with one or more fragment processors of the GPU.

In act 90, the fragment processor receives texture coordinates for each of two or more cut planes. For example, the texture coordinates output by the rasterizer for three or four adjacent cut planes are received as a subset. Each subset includes all different or some overlapping texture coordinates corresponding to all different or some common cut planes. The texture coordinates sent by the rasterizer are received by the fragment program. The cut planes correspond to a subset of cut planes, such as four cut planes from a total of 150-200 cut planes.

The texture coordinates for the cut planes of the each subset are received substantially simultaneously. For example, parallel rasterization processes output texture coordinates for each cut plane in parallel. Some differences in data length or clock phasing may result in differences in timing while still being substantially simultaneously. For each subset of cut planes, the texture coordinates are received substantially simultaneously. Alternatively, one or more sets of texture data corresponding to one or more cut planes are sequentially processed and received. The texture coordinates for cut planes in different subsets are received sequentially.

In act 92, data is obtained as a function of texture coordinates for each of the cut planes in a given subset. Each texture unit looks up the ultrasound or other volume data corresponding to the texture coordinates. The texture units are accessed by the fragment processor. The data is stored in the VRAM. The texture coordinates are stored in a buffer or other memory, such as the VRAM.

In act 94, the data is used to compute the proper opacity (transparency) and opacity-weighted color for the fragment using f(.) and g(.) functions, respectively. As an alternative to opacity weighting the color, a color function without opacity weighting may be used. The f(.) and g(.) functions are linear ramps with low and high cut-offs saturating at 0 and 1 respectively in one embodiment. Depending on the number and type of instructions the fragment program supports, more complex functions for f and g can be implemented, such as piecewise linear or quadratic approximations. The functions are implemented through real time calculation or as lookup tables if the GPU hardware supports additional texture units. The opacity and opacity-weighted color values are then send to the blending stage.

In act 96, the fragment processor of the graphics processing unit composites data. Selecting of a maximum, selection of a minimum, blending, opacity weighted blending or any other now know or later developed compositing may be used. For example, the fragment processor blends data for each subset of cut planes. The blending is performed prior to storage in a frame buffer, such as using cache, RAM, VRAM, buffer or other memory for blending by the fragment processor with minimal use of the frame buffer. Fewer read backs from the frame buffer are used than data sets of cut planes being rendered.

The data for each cut plane is blended by separately combining color and alpha values for the cut planes. For example, opacity weighted color values for three or four cut planes are blended, and opacity values for three or four cut planes are blended. Separate blending operations are provided for each subset of cut planes.

The blending equation is:

$$P_i = [1 - f(I_i)] P_{i-1} + g(I_i)$$

where $P_i$ is the frame content after the $i^{th}$ cut-plane with data, $I_i$, is blended, $f(.)$ is the opacity function and $g(.)$ an opacity-weighted transfer function. When implemented in the frame buffer with sequential rendering or blending of the cut planes 50, the previous data, $P_{i-1}$, is continuously read back from the frame buffer for each cut-plane. The number of read backs is limited by prior blending of subsets. In one embodiment, the fragment processing algorithm processes 3 cut-planes (see 0-2 of FIG. 3) in each sub-set at a time and blends them inside the fragment program. This output is then sent to the frame buffer and blended as before with values from other triplets of cut-planes.

The blending equation for each of the cut-planes 2, 0 and 1, respectively, for this embodiment are:

$$P_i = [1 - f(I_i)] P_{I-1} + g(I_i),$$

$$P_{i+1} = [1 - f(I_{i+1})] P_I + g(I_{i+1}) \text{ and}$$

$$P_{i+2} = [1 - f(I_{i+2})] P_{I+1} + g(I_{i+2}).$$

The output for the frame buffer is the effective opacity and opacity-weighted color, (A, B), after blending the three cut-planes:

$$P_{i+2} = [1 - A] P_{I-1} + B,$$

where, $$A = 1 - [1 - f(I_i)][1 - f(I_{i+1})][1 - f(I_{i+2})] \text{ and}$$

$$B = g(I_{i+2}) + [1 - f(I_{i+2})] g(I_{i+1}) + [1 - f(I_{i+2})][1 - f(I_{i+1})] g(I_i)$$

Other blending functions may be used. Although any other number of cut-planes can also be processed depending on the availability of texture units in the GPU, for embodiments of the present invention, there are at least 4 texture units available. Any number of texture units greater than 1 can be used.

For a first subset, the A and B values are input to the frame buffer. For subsequent subsets, new A and B values for each subset are calculated. As the A and B values are determined for each new subset, the A and B values blended with the current frame buffer values. The effective values for each subset are blended with the values from previous subsets. In the three cut plane subset example above, one read back is provided for blending data for three cut planes into the frame buffer. For generating a three dimensional representation, data is read from a frame buffer at least half a number of times as a number of cut planes for the three dimensional representation.

Once all of the subsets have been blended into the frame buffer, the frame buffer includes data for imaging. The image is a two dimensional representation of the volume from the viewing angle. When the volume data changes, such as due to continuous scanning, or when the viewing angle changes, the process rendering repeats.

In alternative embodiments, maximum intensity projection, minimum intensity projection or other rendering techniques are used. For example and rather than opacity blending with the frame buffer and/or fragment processing, the maximum or minimum values are selected. For fragment processing, the two or three frames of the subset are examined to identify a maximum or minimum value for each ray line or pixel location. A composited subset frame of data includes the selected values from the frames of data in the subset. The frame buffer is then used to select the maximum or minimum of the frame stored in the frame buffer or a current composited subset frame of data.

The instructions for implementing processes at the GPU, vertex processor, CPU and/or fragment processor are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer or system.

The instructions are executable by a vertex processor, fragment processor and/or GPU for vertex or fragment processing as part of volume rendering. For example, the instructions are executable by one or more vertex processors of a GPU for receiving a reference grid and three or more vertices having coordinates defining an intersection of a first cut plane with a proxy geometry and for calculating with the vertex processor texture coordinates in an acoustic domain as range, azimuth and elevation values for grid points within the reference grid.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for blending during volume rendering with a graphics processing unit, the method comprising:
   determining a plurality of cut planes based on a viewing direction, the cut planes being generally parallel with each other and arranged along the viewing direction;
   compositing, with a fragment processor of the graphics processing unit, first and second data for first and second subsets, respectively, of the cut planes, the compositing providing composited first and second data, each of the composited first data and the composited second data being a combination or selection of data for multiple cut planes of the respective first and second subsets, the combination or selecting reducing an amount of data, the composited first data representing pixel locations of a single image and the composited second data representing the same pixel locations of the single image but at different depths relative to the viewing direction; and compositing the composited first data with the composited second data by combination or selection to form the single image representing the pixel locations for the viewing direction.

2. The method of claim 1 wherein compositing first and second data comprises compositing first data for the first subset of three or four cut planes and compositing second data for the second subset of three or four cut planes, the cut planes of the first subset different than any cut plane of the second subset.

3. The method of claim 1 wherein compositing with the fragment processor comprises compositing prior to storage in a frame buffer and wherein compositing the composited first and second data comprises compositing from the frame buffer.

4. The method of claim 1 wherein compositing comprises blending color values and alpha values.

5. The method of claim 1 further comprising:

receiving by the fragment processor texture coordinates for each of the cut planes, the texture coordinates for the cut planes of the first subset received substantially simultaneously, the texture coordinates for the cut planes of the second subset received substantially simultaneously and the texture coordinates for the cut planes of the first subset received prior to the texture coordinates for the cut planes of the second subset; and obtaining the first and second data as a function of texture coordinates for each of the cut planes.

6. The method of claim 1 wherein, for generating a three dimensional representation, data is read from a frame buffer half or fewer a number of times as a number of cut planes for the three dimensional representation.

7. The method of claim 1 wherein said method is used for 3-dimensional cardiology or radiology.

8. The method of claim 1 wherein compositing the first and second data comprises forming first and second data sets as a function of the data for all of the cut planes of the first and second subsets, respectively.

9. The method of claim 1 wherein compositing the first and second data comprises adding data from all the cut planes of the first and second subsets, respectively.

10. The method of claim 1 wherein compositing the first and second data comprises selecting data as a function of all the cut planes of the first and second subsets, respectively.

11. The method of claim 1 wherein the compositing the first and second data comprises compositing in a memory other than a frame buffer of a graphics processing unit.

12. The method of claim 1 further comprising processing, for each cut plane, a planar reference grid of intersecting lines in a Cartesian coordinate space with a vertex processor of the graphics processing unit, wherein compositing first and second data comprises compositing the first and second data mapped from the processed planar reference grid.

13. A method for blending during volume rendering with a graphics processing unit, the method comprising:

receiving, by a fragment processor, texture coordinates for first and second sets of planes through a volume, the planes being stacked in depth along a viewing direction, the planes of the first and second sets corresponding to first and second data at different depths along the viewing direction;

compositing the first data from the first set of planes in the volume, the composited first data representing pixel locations in an image based on the first set;

compositing the second data from the second set of planes in the volume, the composited second data representing the pixel locations in the image based the first set, the composited second data representing different depths than the composited first data; and compositing the composited first data with the composited second data, the image having values for the pixel locations that are a function of the composited first data and the composited second data.

* * * * *